United States Patent
Dasbach et al.

(10) Patent No.: US 10,207,770 B2
(45) Date of Patent: Feb. 19, 2019

(54) METHOD AND DEVICE FOR ACTIVATING A MOTOR OF AN ELECTRIC TWO-WHEELER

(71) Applicant: Robert Bosch GmbH, Stuttgart (DE)

(72) Inventors: Gregor Dasbach, Tuebingen (DE); Philipp Kohlrausch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 26 days.

(21) Appl. No.: 15/316,745

(22) PCT Filed: Apr. 7, 2015

(86) PCT No.: PCT/EP2015/057445
§ 371 (c)(1),
(2) Date: Dec. 6, 2016

(87) PCT Pub. No.: WO2015/185246
PCT Pub. Date: Dec. 10, 2015

(65) Prior Publication Data
US 2017/0144725 A1    May 25, 2017

(30) Foreign Application Priority Data

Jun. 6, 2014    (DE) .................. 10 2014 210 952

(51) Int. Cl.
| | |
|---|---|
| *B62M 6/50* | (2010.01) |
| *B62M 6/45* | (2010.01) |
| *B60L 15/20* | (2006.01) |
| *G01C 21/36* | (2006.01) |

(52) U.S. Cl.
CPC .............. *B62M 6/50* (2013.01); *B60L 15/20* (2013.01); *B62M 6/45* (2013.01); *G01C 21/36* (2013.01);
(Continued)

(58) Field of Classification Search
CPC ....... B62M 6/50; B60L 15/20; B60L 2200/12; B60L 2240/423; B60L 2240/622; G01C 21/36
See application file for complete search history.

(56) References Cited

U.S. PATENT DOCUMENTS

| | | | |
|---|---|---|---|
| 5,553,007 A | 9/1996 | Brisson | |
| 6,059,692 A * | 5/2000 | Hickman | A63B 24/00 482/4 |

(Continued)

FOREIGN PATENT DOCUMENTS

| | | |
|---|---|---|
| DE | 4203920 A1 | 8/1993 |
| DE | 102012211719 A1 | 1/2014 |

(Continued)

OTHER PUBLICATIONS

International Search Report for PCT/EP2015/057445, dated Jun. 19, 2015.

*Primary Examiner* — Behrang Badii
*Assistant Examiner* — Daniel L Greene
(74) *Attorney, Agent, or Firm* — Norton Rose Fulbright US LLP; Gerard Messina

(57) ABSTRACT

A method for activating a motor of an electric two-wheeler, including the following steps: determining a position of a driver of the electric two-wheeler as a function of a first GPS signal, the first GPS signal having a temporal dependence on a starting position; determining a position of a virtual training partner as a function of a second GPS signal, the second GPS signal having a temporal dependence on the starting position; determining a distance between the position of the driver of the electric two-wheeler and the position of the virtual training partner; determining a slipstream effect as a function of a total front face which is formed by the electric two-wheeler and the driver and of the deter- (Continued)

mined distance; and generating a motor torque as a function of the slipstream effect and/or of the determined distance.

11 Claims, 3 Drawing Sheets

(52) U.S. Cl.
CPC ..... *B60L 2200/12* (2013.01); *B60L 2240/423* (2013.01); *B60L 2240/622* (2013.01); *Y02T 10/7258* (2013.01)

(56) References Cited

U.S. PATENT DOCUMENTS

| | | | |
|---|---|---|---|
| 6,645,124 B1 * | 11/2003 | Clem | A63B 22/0023 482/1 |
| 2008/0128027 A1 * | 6/2008 | Hyde | B64C 21/10 137/13 |
| 2008/0191864 A1 * | 8/2008 | Wolfson | G06F 3/011 340/524 |
| 2011/0126143 A1 * | 5/2011 | Williams | G06F 3/0488 715/771 |
| 2011/0254673 A1 | 10/2011 | Jean et al. | |
| 2014/0194250 A1 * | 7/2014 | Reich | A63B 24/0062 482/5 |

FOREIGN PATENT DOCUMENTS

| | | | |
|---|---|---|---|
| GB | 2485216 A | 5/2012 | |
| JP | 2010155523 A1 | 7/2010 | |

* cited by examiner

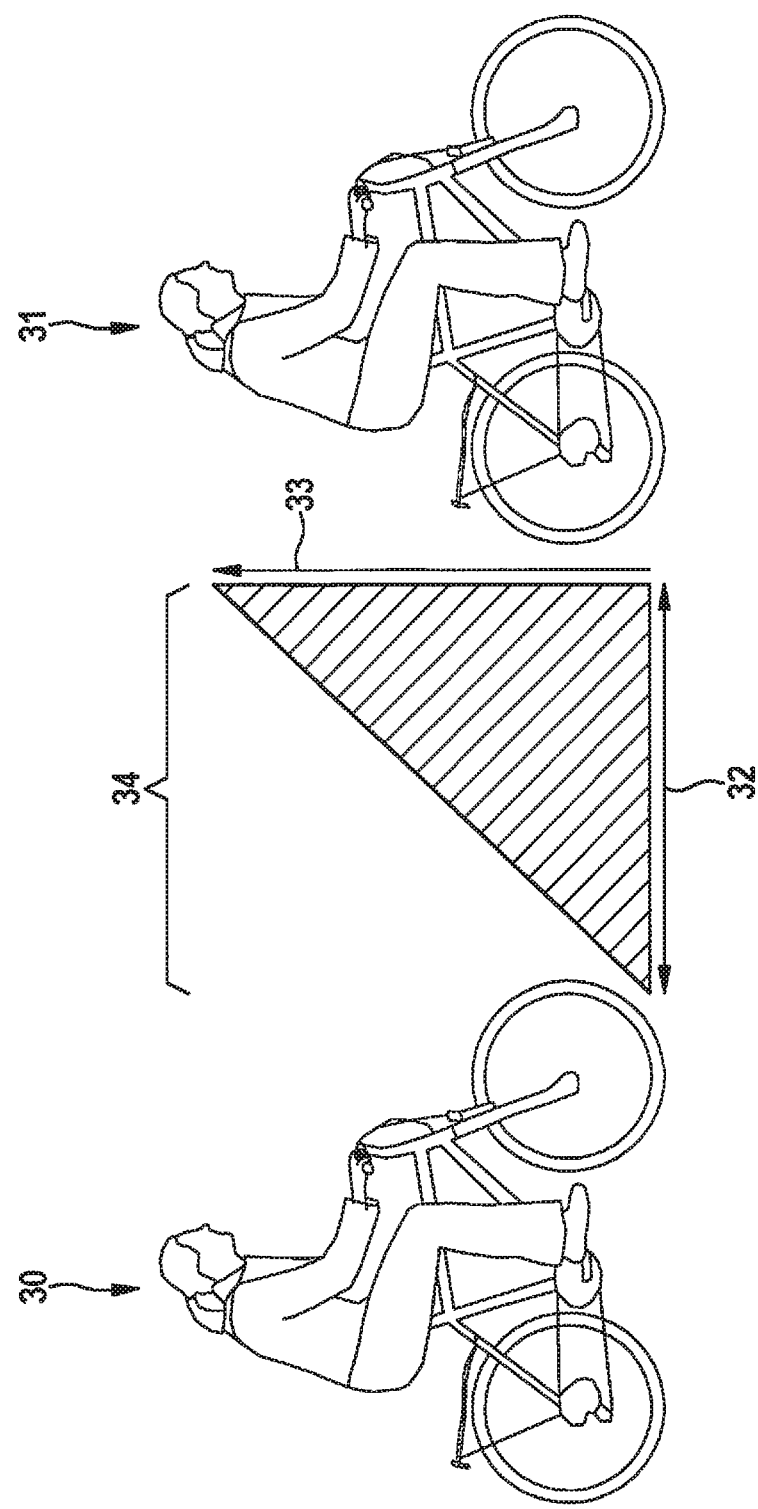

METHOD AND DEVICE FOR ACTIVATING A MOTOR OF AN ELECTRIC TWO-WHEELER

FIELD OF THE INVENTION

The present invention relates to a method and to a device for activating a motor of an electric two-wheeler, and to an electric two-wheeler including such a device.

BACKGROUND INFORMATION

In electric two-wheelers, in general the power of the driver is measured, and a motor torque is activated as a function of the measured power of the driver to assist the driver. The electric two-wheelers may include a GPS-capable operating unit. In addition to displaying driving data, it is possible to carry out a navigation using stored map material. One known function is the function of a virtual training partner. It is known in this regard to display the distance of the driver from the virtual training partner, for example on a display.

The disadvantage is that only the distance between the driver and the virtual training partner is displayed. The effect of driving in the slipstream is not considered.

SUMMARY

It is an object of the present invention to provide the driver with a realistic simulation of joint bicycling.

The method and the device for activating a motor of an electric two-wheeler include the determination of a position of a driver of the electric two-wheeler as a function of a first GPS signal, the first GPS signal having a temporal dependence on a starting position. The term starting position shall be understood to mean a local starting point at which the driver of the electric two-wheeler starts his or her trip. A position of a virtual training partner is determined as a function of a second GPS signal, the second GPS signal having a temporal dependence on the starting position. A distance between the position of the driver of the electric two-wheeler and the position of the virtual training partner is determined. According to the present invention, a slipstream effect is determined as a function of a total front face and the determined distance.

The term slipstream effect here shall be understood to mean the effect which the driver perceives when slipstream is generated by the virtual training partner. The total front face is the frontal contact surface for the wind formed by the real driver and the geometry of the electric two-wheeler. A motor torque is generated as a function of the slipstream effect and/or of the determined distance.

The advantage is that the driver of the electric two-wheeler is able to utilize the slipstream of his or her virtual training partner.

In one refinement, the motor torque is additionally generated as a function of a lateral offset of the position of the driver from the movement line of the virtual training partner. Lateral offset here refers to the distance of the position of the driver perpendicular to the movement line of the virtual training partner. The movement line of the virtual training partner is the route traveled by the virtual training partner.

It is advantageous that the driver of the electric two-wheeler receives a little assistance from the slipstream, although he or she does not directly follow the movement line of the virtual training partner.

In one further embodiment, the total front face is determined as a function of a handle bar shape of the electric two-wheeler and the height of the driver.

In one refinement, the position of the virtual training partner is determined from a trip on the same route stored in a control unit of the electric two-wheeler. This involves in particular a trip which the driver has previously carried out.

The advantage is that the driver may drive against himself or herself and thus design his or her training more efficiently.

In one further embodiment, the driver may plan a route of the virtual training partner with the aid of a map stored in the control unit. The route may be divided into different route sections, it being possible for the route sections to have differing lengths. The driver predefines the time duration which the virtual training partner requires to cover the route section. The position of the virtual training partner is determinable as a function of the second GPS signals. Optionally, the position of the virtual training partner is determinable with the aid of an average speed of the route section.

It is advantageous that the driver is able to individually plan his or her training section.

In one refinement, the slipstream effect is settable as a function of the total front face of the virtual training partner.

The advantage is that the size of the slipstream area is settable.

The device according to the present invention includes an operating unit, which is provided in particular for entering driver data and/or for selecting a route, in particular with a virtual training partner.

The electric two-wheeler according to the present invention includes a device according to the present invention, which includes a control unit having a memory. The control unit detects a first GPS signal, which represents a position of the driver of the electric two-wheeler. The first GPS signal has a temporal dependence on a starting position. The control unit detects a second GPS signal, which represents a position of a virtual training partner. The second GPS signal has a temporal dependence on the starting position. The control unit determines a distance between the position of the driver of the electric two-wheeler and the position of the virtual training partner. The control unit determines a slipstream effect as a function of a total front face and the distance. The control unit generates a signal for activating the motor of the electric two-wheeler as a function of the slipstream effect and/or of the distance. The control unit of the electric two-wheeler carries out a method according to the present invention.

BRIEF DESCRIPTION OF THE DRAWINGS

FIG. 3 shows a motor torque as a function of the distance between the position of the driver of the electric two-wheeler and the position of the virtual training partner.

DETAILED DESCRIPTION

Figure 1:
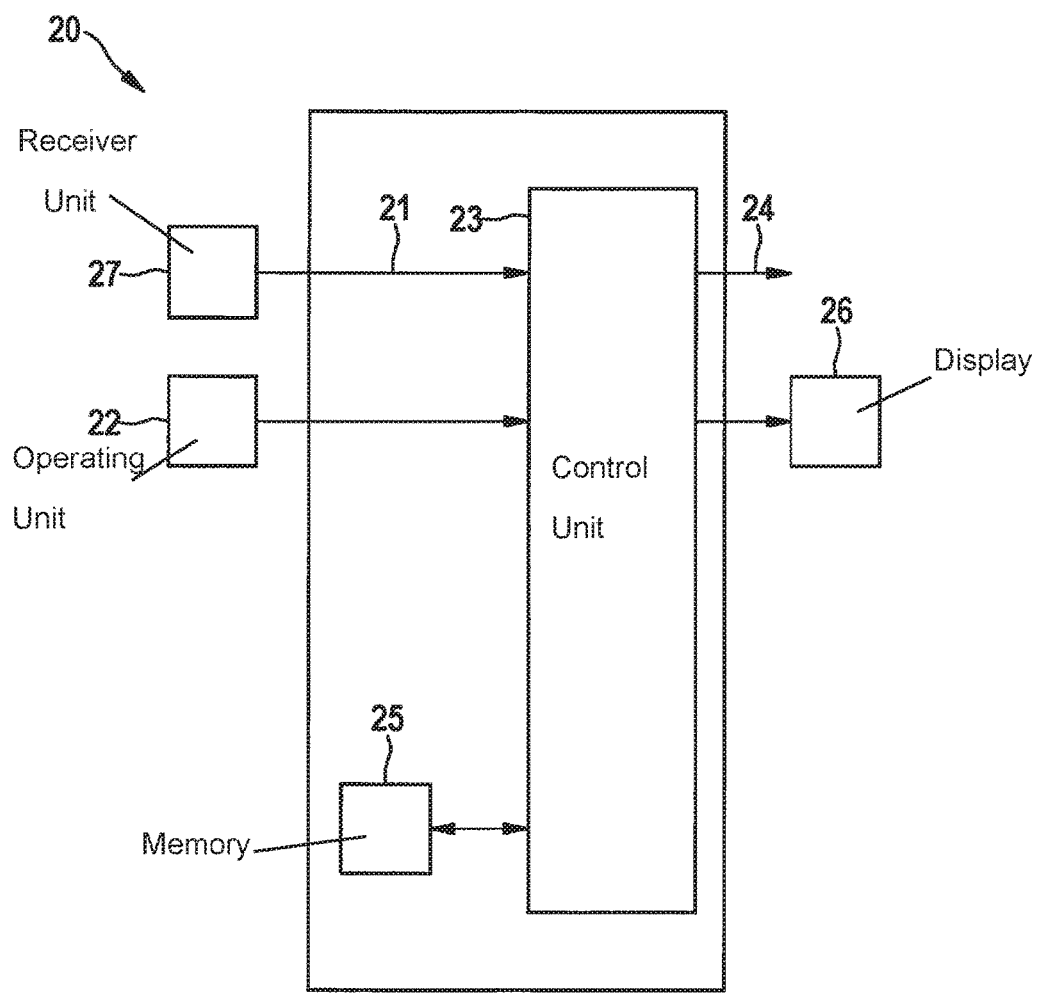
FIG. 1 shows a device for activating a motor of an electric two-wheeler.

FIG. 1 shows a device 20 for activating a motor of an electric two-wheeler. Device 20 includes an operating unit 22, a control unit 23, a memory 25, and optionally a display 26. A receiver unit 27 of control unit 23 detects first GPS signals 21 for determining the position of a driver of an electric two-wheeler. Control unit 23 also detects inputs which are entered with the aid of operating unit 22 and stored or buffered by control unit 23 in memory 25. Control unit 23 generates a signal 24 for activating the motor of the electric two-wheeler. Signal 24 generates a motor torque which assists the driver during the trip with his or her electric two-wheeler.

In a further exemplary embodiment, operating unit 22 is situated within reach of the driver, for example on the handle bar of the electric two-wheeler. Operating unit 22 may be designed as a fixedly installed on-board computer. In this case, the on-board computer acts as a human-machine interface.

In one further exemplary embodiment, operating unit 22 includes a smart phone, which is connected to an on-board computer of the electric two-wheeler via a wireless connection, for example via Bluetooth. In this case, the on-board computer detects the data which are entered with the aid of the smart phone, and forwards these to the control unit.

In one further exemplary embodiment, operating unit 22 includes a computer, which is connected to the on-board computer via a connection such as USB, Bluetooth or WLAN. In this case, the on-board computer detects the data which are entered with the aid of the computer, and forwards these to the control unit.

Figure 2:
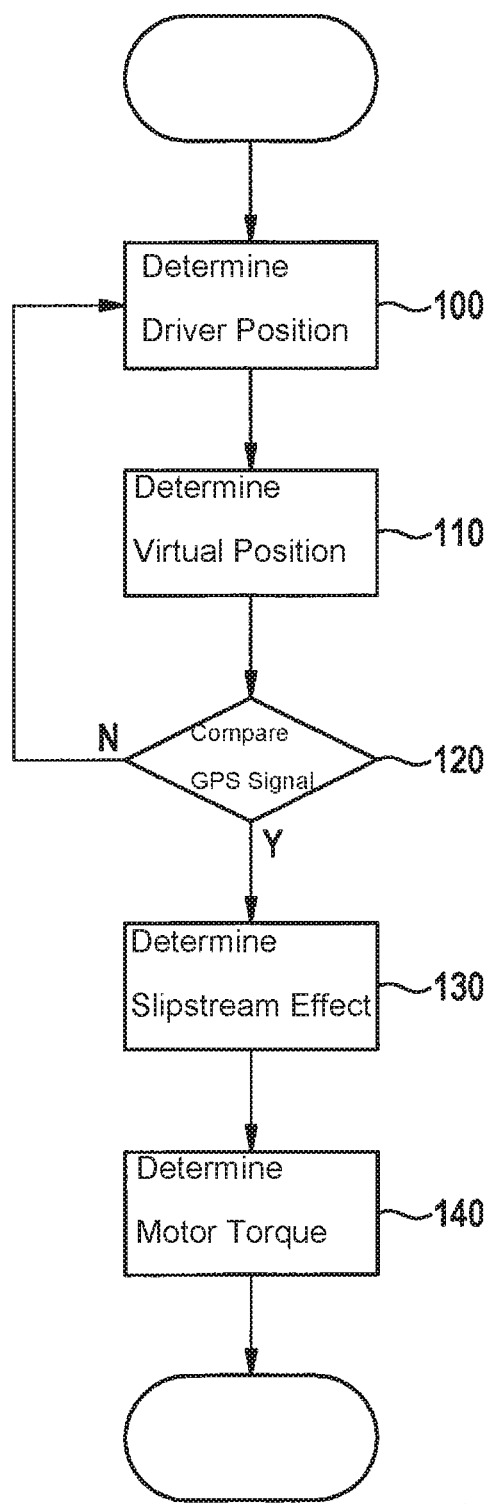
FIG. 2 shows a flow chart of a method for activating a motor of an electric two-wheeler.

FIG. 2 shows a method for activating a motor of an electric two-wheeler. The method is started with step 100, in which a position of a driver of the electric two-wheeler is determined with the aid of a control unit. The position is determined as a function of a first GPS signal, for example, the first GPS signal being detected with the aid of a receiver unit. The first GPS signal has a temporal dependence on a starting position. In a subsequent step 110, a position of a virtual training partner is determined as a function of a second GPS signal. This second GPS signal was generated during a previously conducted trip of the same route and stored in the memory of the control unit. This means that the second GPS signal is detected from the memory, and the control unit determines the position of the virtual training partner. The second GPS signal also has a temporal dependence on the starting position. In a subsequent step 120, a distance between the position of the driver of the electric two-wheeler and the position of the virtual training partner is determined in that the first GPS signal and the second GPS signal are compared to one another, or the first GPS signal is subtracted from the second GPS signal. If the difference between the GPS signals has a positive value or is zero, i.e., the driver of the electric two-wheeler is slower than the virtual training partner, in a subsequent step 130 a slipstream effect is determined as a function of a total front face and the distance determined in step 120. If the difference between the GPS signals has a negative value or is zero, i.e., the driver is faster than or as fast as the virtual training partner, the method is ended or restarted. In a step 140 following step 130, a motor torque is determined as a function of the slipstream effect and/or of the distance determined in step 120.

In one further exemplary embodiment, the driver of the electric two-wheeler will also benefit from the slipstream effect when driving laterally offset from the movement line of the virtual training partner, i.e., not on the ideal line. The lateral offset is determined by a perpendicular distance of the position of the driver to the movement line of the virtual training partner. The motor torque is additionally determined as a function of the lateral offset. The smaller the lateral offset, the greater is the assisting motor torque.

FIG. 3 shows motor torque 33 as a function of distance 32. This is a linear function. The smaller the distance of driver 30 of electric two-wheeler to virtual training partner 31, the greater is the additional motor torque 33 assisting driver 30 of the electric two-wheeler. The maximum distance at which driver 30 of the electric two-wheeler is still able to utilize slipstream 34 is approximately five meters. This means that driver 30 benefits from an additional assistance of the slipstream when distance 32 drops below a maximum of five meters from virtual training partner 31.

The total front face is dependent on the geometry of the electric two-wheeler, including the handle bar position and the height of the driver. The total front face is the surface area of the electric two-wheeler, including the driver, which is frontally exposed to the wind. The total front face may be calculated with the aid of an approximation formula, for example, which considers both two constants a and b, and the height of the driver and the air drag coefficient. The approximation formula reads: air drag coefficient*total front face$[m^2]$=a $[m^2]$ b $[m^2/cm]$ height of the driver [cm]. A distinction in terms of the handle bar position of the electric two-wheeler is made between different two-wheeler types, such as touring bike, racing bike including top bar, racing bike including drop bar. The constants for the touring bike are approximately a=0.5 and b=0.0015, for the racing bike including top bar approximately a=0.32 and b=0.001, and for the racing bike including drop bar approximately a=0.26 and b=0.0005. The height of the driver may be entered with the aid of the operating unit or read out from the memory.

The position of the virtual training partner may be detected during a trip of the driver, a so-called training trip, with the aid of the control unit via GPS signals. The recording or the storing of the training trip is controlled with the aid of the operating unit. It is possible to store multiple training trips.

In one further exemplary embodiment, the position of the driver of the electric two-wheeler during a trip is determined with the aid of a map stored in the control unit in that the driver marks his or her starting point, for example with the aid of the operating unit. The position of the virtual training partner may be determined with the aid of the stored map in that the driver selects a route in which the starting point agrees with or is comparable to his or her present position. The driver may divide the route into different route sections and predefine a certain time duration for each route section which the virtual training partner is to require to cover the route section. The virtual training partner may either drive at a certain speed, the so-called average speed, or vary the speed within the route section, so that different training modes may be simulated, for example in the form of a ramp function, i.e., the speed increases over the route section. Optionally, the total front face of the virtual training partner may be varied, so that the area of the slipstream changes.

In one further exemplary embodiment, the driver of the electric two-wheeler may trip with multiple virtual training partners. In this way, a so-called Belgian tourniquet may be simulated in which the driver and the virtual training partners rotatingly alternate the leading role.

In one further exemplary embodiment, the distance of the driver of the electric two-wheeler is displayed on a display of the electric two-wheeler. The display is connected to the control unit.

In one further exemplary embodiment, the wind direction may be detected with the aid of the control unit. Depending on the wind direction, the optimal position of the driver compared to the movement line of the virtual training partner may be displayed to the driver of the electric two-wheeler on the display, so that he or she is given the greatest possible assistance from the motor when he or she follows the virtual training partner on this position.

What is claimed is:

1. A method for activating a motor of an electric two-wheeler, comprising:
    determining a position of a driver of the electric two-wheeler as a function of a first GPS signal, the first GPS signal having a temporal dependence on a starting position;
    determining a position of a virtual training partner as a function of a second GPS signal, the second GPS signal having a temporal dependence on the starting position;
    determining a distance between the position of the driver of the electric two-wheeler and the position of the virtual training partner;
    determining a slipstream effect as a function of the determined distance and a total front face that is formed by the electric two-wheeler and the driver; and
    generating a motor torque as a function of at least one of the slipstream effect and the determined distance.

2. The method as recited in claim 1, wherein the motor torque is additionally generated as a function of a lateral offset of the position of the driver from a movement line of the virtual training partner.

3. The method as recited in claim 1, wherein the total front face is determined as a function of a handle bar shape of the electric two-wheeler and a height of the driver.

4. The method as recited in claim 1, wherein the position of the virtual training partner is determined as a function of a plurality of second GPS signals, the second GPS signals being stored in a control unit with the aid of a trip on the same route.

5. The method as recited in claim 4, wherein the trip on the same route is a trip of the same driver.

6. The method as recited in claim 1, wherein the driver is able to select a route with the aid of a stored map and divide the route into different route sections, for which the driver predefines a time duration, so that the position of the virtual training partner is determinable as a function of a plurality of second GPS signals.

7. The method as recited in claim 6, wherein the driver selects the route prior to starting a trip.

8. The method as recited in claim 6, wherein the slipstream effect is settable as a function of the total front face of the virtual training partner.

9. A device for activating a motor of an electric two-wheeler, comprising:
    a control unit that includes a memory, the control unit:
        detecting a first GPS signal that represents a position of the driver of the electric two-wheeler, the first GPS signal having a temporal dependence on a starting position;
        detecting a second GPS signal that represents a position of a virtual training partner, the second GPS signal having a temporal dependence on the starting position; and
        determining a distance between the position of the driver of the electric two-wheeler and the position of the virtual training partner, wherein:
        the control unit determines a slipstream effect as a function of the determined distance and a total front face that is formed by the electric two-wheeler and the driver; and
        the control unit generates a signal for activating the motor of the electric two-wheeler as a function of at least one of the slipstream effect and of the determined distance.

10. The device as recited in claim 9, further comprising:
    an operating unit for at least one of entering driver data and for selecting a route with a virtual training partner.

11. An electric two-wheeler, comprising:
    a device for activating a motor of an electric two-wheeler, the device comprising:
        a control unit that includes a memory, the control unit:
            detecting a first GPS signal that represents a position of the driver of the electric two-wheeler, the first GPS signal having a temporal dependence on a starting position;
            detecting a second GPS signal that represents a position of a virtual training partner, the second GPS signal having a temporal dependence on the starting position; and
            determining a distance between the position of the driver of the electric two-wheeler and the position of the virtual training partner, wherein:
            the control unit determines a slipstream effect as a function of the determined distance and a total front face that is formed by the electric two-wheeler and the driver; and
            the control unit generates a signal for activating the motor of the electric two-wheeler as a function of at least one of the slipstream effect and of the determined distance.

* * * * *